Jan. 5, 1932.  H. T. WOOLSON  1,840,147
GASKET
Filed Feb. 8, 1928

Inventor
HARRY T. WOOLSON
By J. King Harness
Attorney

Patented Jan. 5, 1932

1,840,147

UNITED STATES PATENT OFFICE

HARRY T. WOOLSON, OF DETROIT, MICHIGAN, ASSIGNOR TO CHRYSLER CORPORATION, OF DETROIT, MICHIGAN, A CORPORATION OF DELAWARE

GASKET

Application filed February 8, 1928. Serial No. 252,767.

This invention relates to gaskets and more particularly to cylinder head gaskets or gaskets used for sealing chambers subjected to extremely high pressure.

An important object of the invention is to provide a gasket which, when compressed is securely held in position and a tight seal is obtained throughout the entire surface of the gasket.

Heretofore gaskets have been used in which it was possible to obtain a tight seal around the periphery of an opening but the body portion of the gasket has not been securely held and as a result the portion tightly sealed or adjacent the periphery of the opening would be blown away from the sealing position under high pressures.

The present invention overcomes this difficulty by forming the gasket in such a manner that the body portion is securely held between two compressed members and forms a rigid backing for the sealing member adjacent the periphery of the pressure chamber.

Another object of the invention is to provide an all metal gasket preferably formed of laminated strips held together as a unit.

A further object of the invention is to form ferrules within the outer surface of the gasket to seal the surfaces exposed to high pressure.

These and other objects of the invention will more fully appear from the following specification and claims taken in connection with the accompanying drawings, in which:

Figure 1:
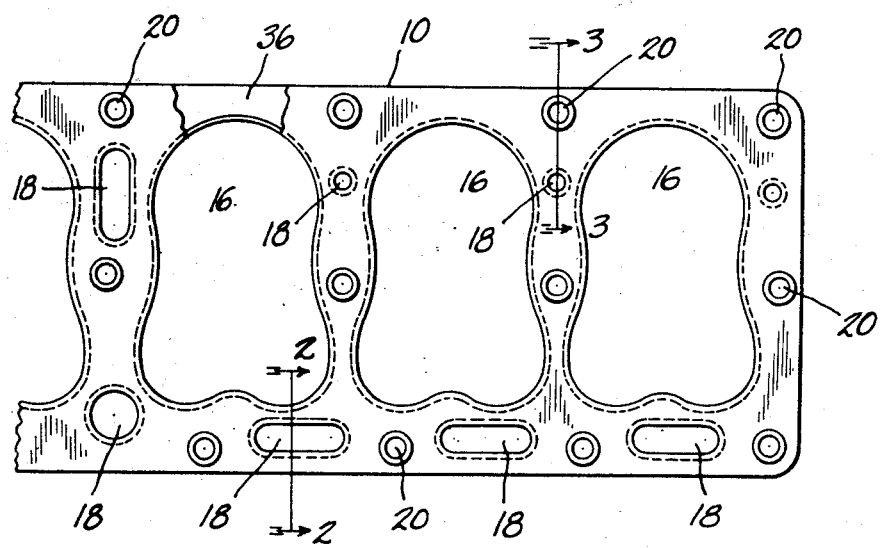
Fig. 1 is a plan view of the gasket with parts broken away.

For the purpose of illustration the gasket 10 has been shown designed for use between the cylinder block 12 and cylinder head 14 of an internal combustion engine. Openings 16 have been provided for the combustion chamber, water passage openings are shown at 18 and apertures 20 are shown to receive the bolts 22 securing the head 14 to the block 12.

Figure 4:
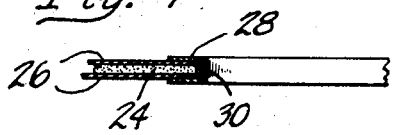
Fig. 4 is a sectional view taken of another form or asbestos lined gasket.
Figure 5:
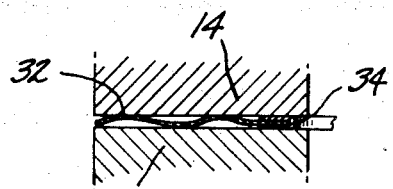
Fig. 5 is a sectional view of a single sheet gasket.
Figure 6:
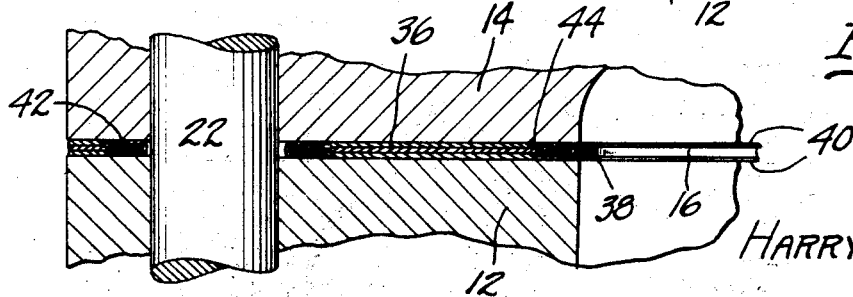
Fig. 6 is a sectional view showing the gasket compressed between the block and cylinder head of an internal combustion engine.

Considering a gasket of the type shown in Fig. 4 or 5, considerable difficulty has been experienced in securing the gasket in sealing position and under high pressure the gasket is "blown out" due to the insecure backing of the sealing portion. The type shown in Fig. 4 consists of an asbestos lining 24 and outer metallic members 26. A binder or ferrule 28 secures the parts together. When such a gasket is compressed the central portion 30 of the ferrule breaks under high pressure due to the pliable backing or asbestos lining and the pressure escapes through the opening. Fig. 5 shows a single sheet of metal 32 having a ferrule 34. In the use of this form the body portion of the sheet is not sufficiently held to form a backing for the compressed ferrule and its tendency is to be forced away from the sealing position as shown, and the ferrule torn, thereby causing leakage. This is particularly true where the body portion of the gasket is small.

The present invention overcomes this difficulty by rigidly securing the ferrule in sealing position and providing an upper and lower reinforcement for the central strip.

Figure 2:
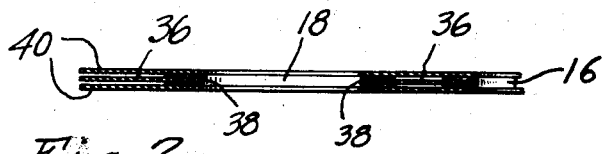
Fig. 2 is a sectional view taken on line 2—2 of Fig. 1.
Figure 3:
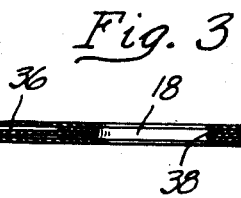
Fig. 3 is a sectional view taken on line 3—3 of Fig. 1.

Referring to Figs. 2 and 3 a central sheet of metal 36, preferably copper, has ferrules or sealing flanges 38 around the inner periphery of the openings 16 for the combustion chamber, and openings 18 for the water passages. Outer sheets of metal 40, conforming to the central sheet, are secured to the central sheet 36 by means of binders or ferrules 42 with the portions adjacent the openings for the combustion chambers and water passages overlapping the sealing ferrules 38.

It is desirable to cover the sealing ferrules 38 around the combustion chamber in order to obtain a greater contacting surface around the periphery of the opening between the cylinder block and head. Where the ferrule is exposed to the block and head the surface in contact therewith is only equal to the width of the ferrule, while in a gasket having covered ferrules the entire outer surfaces contact with the head and block and form a seal therewith.

Another desirable feature of the invention is that with the covered ferrules, under compression, an abutment 44 is formed for the ferrule and its expansion is prevented. This abutment is formed by the compressing of more metal at the ferrule than at any point in the body portion. Due to the additon of the outer sheets the compression along the body portion is greater than where a single sheet is used or where a soft pliable lining is used such as asbestos. In other words it requires less pressure to compress five thicknesses of metal to less than the thickness of three, than it requires to compress three thicknesses of metal to a thickness less than the thickness of one, consequently the entire gasket is firmly held under pressure between the head 14 and block 12 with a greater pressure adjacent the periphery of the pressure chamber.

There are certain features herein disclosed which are applicable to gaskets other than those used for cylinder head gaskets and it is not my intention to limit this invention other than by the terms of the appended claims, as various changes may be made without departing from the spirit or scope thereof including size, material and arrangement of parts.

What I claim is:

1. In a gasket comprising a plurality of metallic sheets having aligned apertures therein, means for securing said sheets together, and ferrules around the inner periphery of apertures of one sheet, the outer surfaces of said ferrules being covered by the other sheets.

2. In a gasket of the class described comprising a central metallic sheet having apertures therein, ferrules around the inner periphery of apertures in said sheet, outer metallic sheets having apertures corresponding to the apertures in said central sheet and overlapping the outer surfaces of said ferrules and means for securing said parts in assembled relation.

3. A gasket comprising a plurality of sheets having aligned openings therein, a ferrule around some of the openings embracing only a portion of said sheets, and a ferrule around the other openings embracing all of said sheets.

4. A gasket comprising a central sheet member and a sheet member on the opposite sides of said central sheet member, said sheet members having corresponding openings therein, a ferrule around some of the openings in said central sheet members only, and a ferrule around some of the openings embracing said central sheet member and at least one of said outer sheet members.

HARRY T. WOOLSON.